United States Patent [19]

Aghazadeh

[11] 3,810,232

[45] May 7, 1974

[54] MAGNETIC MEMORY READ SYSTEM FOR DIGITAL RECORDINGS

[75] Inventor: Shirzad Aghazadeh, Los Angeles, Calif.

[73] Assignee: The Singer Company, New York City, N.Y.

[22] Filed: Oct. 18, 1972

[21] Appl. No.: 298,730

[52] U.S. Cl. .......... 340/174.1 H
[51] Int. Cl. .......... G11b 5/02
[58] Field of Search .......... 340/174.1 B, 174.1 H

[56] References Cited

UNITED STATES PATENTS

| | | | |
|---|---|---|---|
| 3,715,738 | 2/1973 | Kleist et al. | 340/174.1 H |
| 3,735,372 | 5/1973 | Coccagna | 340/174.1 H |
| 3,478,255 | 11/1969 | Parker et al. | 340/174.1 H |
| 3,581,297 | 5/1971 | Behr | 340/174.1 H |

*Primary Examiner*—Vincent P. Canney
*Attorney, Agent, or Firm*—L. B. Castle

[57] ABSTRACT

A magnetic memory read system for digital recordings is provided which utilizes peak detection principles to reconstruct digital data recorded on a magnetic memory, such as a tape, drum or disc. The read system incorporates magnetic data reconstruction circuitry which employs both zero crossing-detecting means and threshold detection means in two channels which are ultimately combined to accurately detect the output of a magnetic read head at very high and very low peak densities. An enabling signal is developed in the second channel which permits precisely phased signals of the first channel to pass to the output for reconstruction into a corresponding data signal, but which disables the output with respect to spurious signals detected in the first channel, for example, to "shoulders" in the output signal of the read head. These "shoulders" appear as the packing density of the digital recordings on the magnetic medium falls below a particular threshold.

4 Claims, 2 Drawing Figures

MAGNETIC MEMORY READ SYSTEM FOR DIGITAL RECORDINGS

RELATED APPLICATIONS

Application Ser. No. 139,110, filed Apr. 30, 1971 for Shirzad Aghazadeh for Digital Recording System. This is now U.S. Pat. No. 3,699,556, issued Oct. 17, 1972.

BACKGROUND OF THE INVENTION

All digital computing equipment requires some type of memory storage, and most of the present day computer memories store the data in binary form on moving magnetic mediums, such as magnetically coated tape, drum, or rotating disc. Because they are unlimited in length, tape memories have a very large storage capacity potential but are considered comparatively slow because of the time required to search for particular data along the length of the tape. Disc and drum memories have very fast access to the data because, as the disc or drum rotates, the data passes under the transducer at each revolution. However, disc or drum memories have a limited capacity depending upon the number of tracks of data, the length of the tracks, and the bit density of recorded data in the tracks. In order to obtain the maximum storage capacity from a given size rotatable memory, it is necessary to select an efficient data recording system.

The simplest magnetic recording method is commonly referred to as the "return to bias" method, which records on the magnetic medium a pulse representing a binary "1" and the lack of a pulse representing a binary "0". Although a simple and inexpensive system, this method of recording is not widely used because the two flux changes required for recording each bit produces a relatively slow recording system, and also because the absence of any recording represents a binary "0" and thus may result in readout error.

The possible errors introduced by the lack of a signal being read as a binary "0" is overcome by a recording system referred to as the "return to zero" method of recording, in which a binary "1" is represented by a recorded pulse of one polarity and a binary "0" by a pulse of the opposite polarity. While solving the problem of possible readout error, from lack of signal, this method of recording is relatively slow and not widely used because it is, again, a double transition method requiring two flux changes per recorded bit.

A system which apparently obviates all of the disadvantages referred to above is the "non-return to zero" (NRZ) method, which is fast in that there is a maximum of one flux change per bit, i.e., the transducer current switches only when a binary "1" is recorded. Although very popular, this NRZ method has its disadvantages. Because there is not always an output for each bit sensed by the transducer, the method is not self-clocking and it is, therefore, necessary to record a clock track along the data tracks. Furthermore, the method is subjected to amplitude dependent time errors, that is, since data is contained only in flux changes, the amplitude of the read-back signal will vary with the data pattern. Another problem of NRZ according is associated with the existence of high frequency noise at the baseline of the signal in patterns that contain fewer flux changes. The existence of this type of noise increases the error probability and the necessary complexity of the read amplifier design.

Still another method of recording is known as "phase modulation recording" in which the recording current wave form consists of a series of complete cycles, a "1" differing from a "0" only in phase. Although phase modulated signals require a maximum of two flux changes per bit, it is possible to record by this method at a very high rate and at bit densities approaching that of the NRZ method of recording. Furthermore, since there is an output signal for each recorded bit, this system can be made self-clocking and the output information can be correctly interpreted without the necessity of a separately recorded clock signal, as is required in the NRZ method.

The system described and claimed in the aforementioned application comprises a means for improving upon the phase modulation recording system by providing improved circuitry which serves to double the bit density of a phase-modulated digital data signal, and therefore to double the memory capacity of the magnetic recording medium. The system of the present invention is also concerned with phase modulation recording of digital data, and has the form of an improved signal reconstruction system which is capable of accurately reading the digital recordings on the magnetic recording medium and for providing an accurately reconstructed output for both high- and low-packing density of the digital data on the magnetic medium.

The prior art data reconstruction circuitry for the phase modulation type of recording usually employs peak detection circuitry and signal differentiating circuitry, along with zero-crossing detection circuitry, in order to reconstruct the recorded data. As long as the packing density of the recording data is high and no shoulders exist on the output signal from the read head, the prior art system is capable of providing accurately reconstructed output signals, with the transitions at the output of the zero-crossing detection circuitry accurately corresponding to the transitions of the original data signal. However, as the packing density of the recorded digital data decreases, or as the line frequency changes to cause the speed of the magnetic medium to be lowered, for example, shoulders begin to appear on the output signal of the read head, and these shoulders create spurious spikes at the output of the zero-crossing detection circuitry.

Differentiation circuitry has been used in the past in such signal reconstruction systems, along with appropriate threshold detection circuitry, so that the recorded data may be reconstructed by differentiating means when the packing density is low. This latter prior art technique eliminates the spurious spikes, due to the shoulders, which appear at the output of the zero-crossing detection circuitry in the former prior art system. However, the accuracy of the prior art threshold detection reconstruction system is inferior to the former system due to the fact that the slopes of the output from the differentiation circuitry are different for different data patterns.

The signal reconstruction system of the present invention combines the advantages of both the zero-crossing detection circuitry and the differentiation circuitry of the prior art to provide an extremely reliable and accurate system for reconstructing recorded magnetic digital data at both low and high packing densities. In the system of the present invention, the differentiation circuitry technique is used to eliminate the spurious spikes from the output of the zero-crossing detector, and the zero-crossing detection technique is used to preserve accuracy in the reconstruction process.

DETAILED DESCRIPTION OF THE ILLUSTRATED EMBODIMENT

Figure 1:
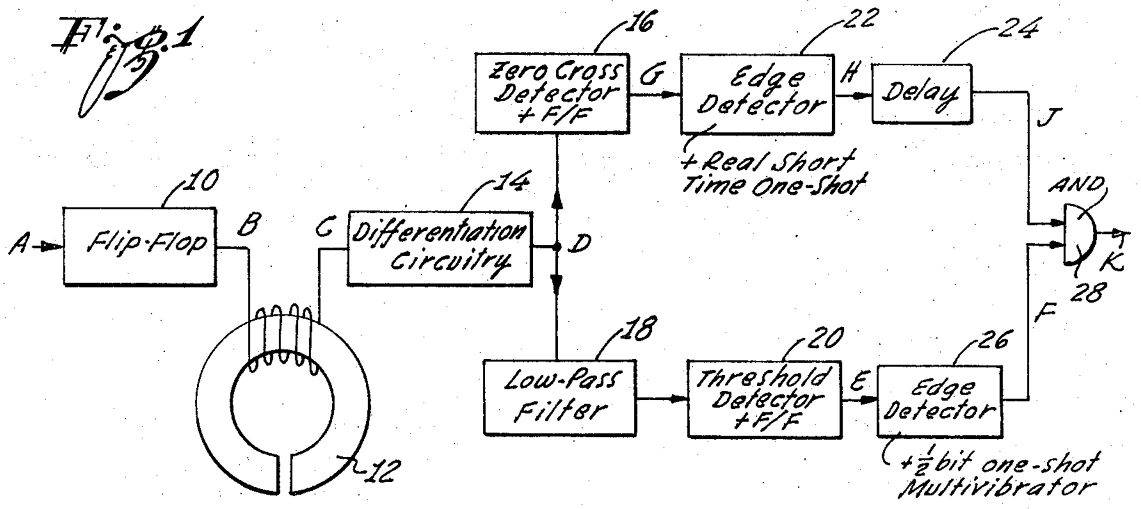
FIG. 1 is a block diagram of a signal reconstruction system embodying the concepts of the invention.

At the outset, it is to be noted that the system of the invention is formed of known circuit components, and, for that reason, the system is represented in block form in FIG. 1. Since the actual circuitry of the individual blocks in FIG. 1 is well known to the art, it is deemed unnecessary for the purposes of the present invention to describe such detailed circuitry herein. It is also to be noted that the block diagram of FIG. 1 makes use of capital letters at the output terminals of each block in the diagram. These letters refer to correspondingly identified wave forms in FIG. 2.

Figure 2:
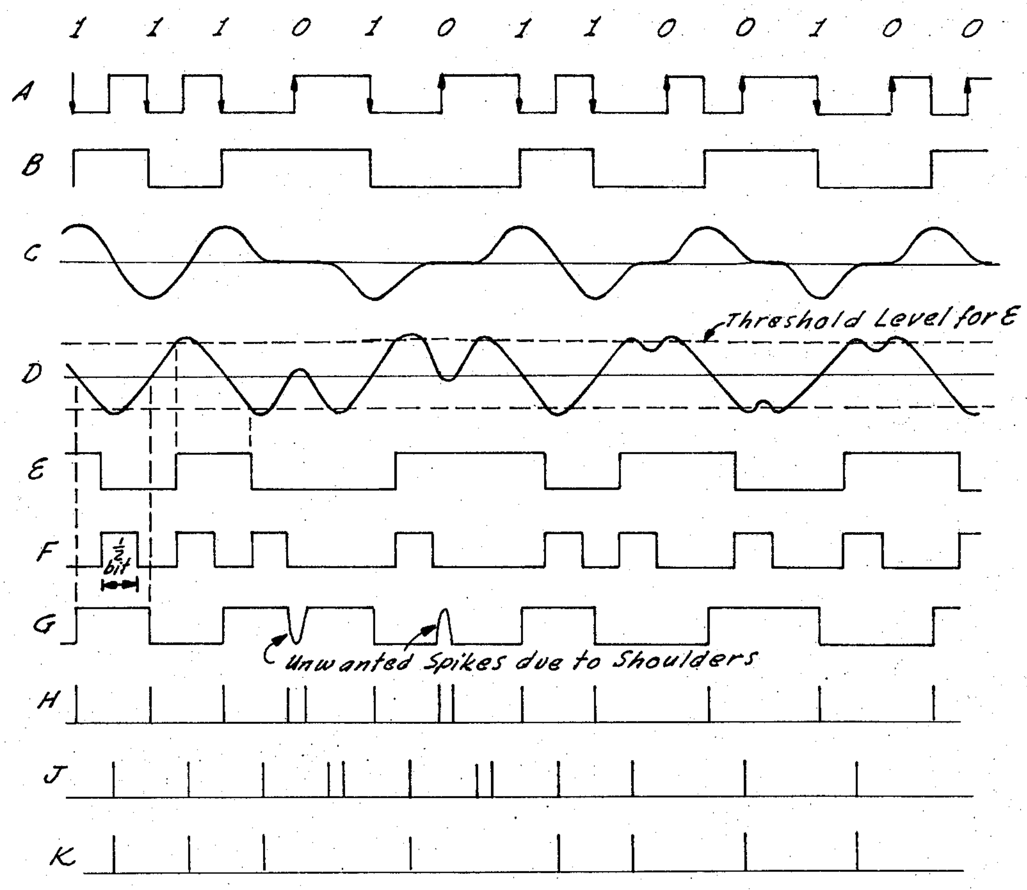
FIG. 2 is an illustration of typical wave forms appearing at various points in the block diagram circuitry illustrated in FIG. 1.

Therefore, referring to both FIG. 1 and FIG. 2 of the drawing, a binary data input signal A is introduced to a flip-flop 10 in the form of a phase modulation representation such as described in the aforesaid U.S. Pat. No. 3,669,556. It can be seen in the wave form A, that a binary "1" is represented by a signal having a high portion followed by a low portion; and that a binary "0" is represented by a signal having a low portion followed by a high portion. The phase modulation representation of alternating bits such as "1010" in wave form A has only one transition per bit, which, upon recording, would be one magnetic flux change per bit. However, the phase modulation representation of non-alternating bits, such as "11" or "00" can be seen in the wave form A to have two transitions and flux changes per bit.

The packing density of a moving magnetic medium and, therefore, the capacity of the magnetic memory is limited by the number of flux changes per unit length. Thus, the bit packing density and the capacity of a memory can be doubled if the same data could be recorded with only half as many flux changes per unit length. Accordingly, the phase modulation signal A is applied to a flip-flop 10 which divides the phase modulation wave form A to produce a recording current such as shown by the wave form B. The flip-flop 10 may be a JK flip-flop with the J and K terminal connected to a clock input so that the flip-flop switches only when its input signal A drops from a "1" to a "0". This modified phase modulation signal B is then recorded on the magnetic medium by an appropriate electromagnetic transducer 12. A suitable write amplifier (not shown) may be interposed between the output of the flip-flop 10 and the winding of the transducer 12.

The recorded signal is demodulated, or reconstructed, by first reading the magnetic medium with the transducer 12 and applying the signal C to appropriate differentiation circuitry 14. A suitable pre-amplifier may be interposed between the winding of the transducer 12 and the input of the differentiation circuitry 14. A differentiation circuitry 14 responds to the input signal C to provide a differentiated output signal D. The output signal D is applied to a zero-crossing detector circuit 16 and to a low pass resistance/capacitance filter 18.

The zero-crossing detector circuit 16 produces a spike each time the signal D crosses the reference axis, and it also may contain, for example, a flip-flop which responds to the spikes, so that the output signal G from the zero-crossing detector has the wave form shown in the curve G of FIG. 2. It will be noted that the wave form G undergoes a transition each time the wave form D crosses the reference axis. However, it will be observed that the wave form C produced by the transducer 12 develops shoulders at certain points due to a low packing density of the recorded digital signals. It will also be observed that the zero-crossing detector 16 produces spurious spikes in its output due to the shoulders. These spikes create inaccuracies in the resulting reconstituted signal, and must be removed.

The output D from the differentiation circuitry is also passed through the low pass filter 18 to a threshold detector 20. The threshold detector 20 detects each time the signal D, upon passing through the low pass filter 18, crosses a preset threshold level at each peak, as shown by the broken lines in the curve D. The threshold detector 20 may includes appropriate flip-flop circuitry, so that it develops the wave form E in response to the input signal. It will be noted that the peak detection process resulting in the signal E does not respond to the spurious transitions in the signal D due to the shoulders of the signal C. However, the signal E is not appropriate in and of itself to form the ultimate output signal, because the resistance/capacitance filter 18 introduces phase shifts to the entire wave form, so that inaccuracies arise. However, in the present invention, the signal E is used merely as an enabling signal, as will be described, with the timing of the ultimate output being controlled by the signal G from the zero-crossing detector 16.

Accordingly, the signal G is applied to an edge detector 22 which may, for example, comprise a one-shot multivibrator having a short time interval. The edge detector 22 responds to transitions in the signal G to produce spikes, as shown by the wave form H in FIG. 2. It will be observed that the wave form H includes spurious spikes due to the detected transitions in the differentiated signal D produced by the shoulders of the signal C.

The spikes of the wave form H are delayed by an appropriate delay line 24 to produce a signal J, as represented by the corresponding wave form in FIG. 2. The delay is such that the spikes of the wave form J are brought into phase with an enabling signal F which is derived from an edge detector 26, the edge detector 26 being similar in construction to the edge detector 22. The edge detector 26 is activated by the signal E from the threshold detector 20.

The signal E, as explained above, is a representation of the signal to be reconstructed, but is inaccurate due to phase shifts in the low pass filter 18, as explained above. However, the signal E from the threshold detector 20 does not contain transitions due to the spurious spikes of the wave form G. On the other hand, the signal G from the zero-crossing detector 16 does represent an accurate form of the signal to be reconstructed, insofar as timing and phase is concerned, but contains the unwanted spikes, as described above. Accordingly, an "and" gate 28 is provided, and the signal F is applied to the "and" gate as an enabling signal, whereas the precisely timed signal J is applied to the "and" gate, with an appropriate phase shift to bring it within the range of the enabling signal. Therefore, the "and" gate 28 develops an output K which is a precise reconstruction of the transitions of the modulated input data, as represented by the wave form B. The actual data signal may then be reconstituted by any appropriate means, such as described, for example, in the aforesaid U.S. Pat. No. 3,699,556.

The invention provides, therefore, an improved signal reconstruction system, whereby recorded digital data may be reconstructed into a corresponding data wave with a high degree of accuracy, even when the packing density of the recorded digital data is relatively low.

It will be appreciated that although a particular embodiment of the invention has been described, modifications may be made. It is intended in the claims to cover the modifications which fall within the spirit and scope of the invention.

What is claimed is:

1. A demodulation system for reconstructing digital data recorded by phase modulation on a magnetic medium, said system including: a transducer for sensing the digital recordings on the magnetic medium and for transforming the recordings into a corresponding phase modulated signal; differentiating circuitry coupled to said transducer for producing a differentiated output signal corresponding to said phase modulated signal; first circuitry including zero-crossing detecting means coupled to said differentiating circuitry for producing output pulses representative of the crossing by said differentiated signal of a particular reference axis; second circuitry including threshold detecting means coupled to said differentiating circuitry for producing an enabling signal representative of the crossing by the peaks of said differentiated signal of predetermined threshold axis; and gate means coupled to the outputs of said first and second circuitry and responsive to said output pulses and to said enabling signal for producing an output only when an output pulse from said first circuitry coincides with a particular amplitude state of the enabling signal from said second circuitry.

2. The modulation system defined in claim 1, in which said first circuitry includes delay means for establishing a predetermined timing between said output pulses and said enabling signal.

3. The demodulation system defined in claim 2, in which said second circuitry includes multivibrator means for producing said enabling signal with a rectangular wave form having first and second amplitude values to cause said gate means to be enabled only when said enabling signal has a particular one of said two amplitude values.

4. The demodulation system defined in claim 1, in which said output pulses produced by said first circuitry include spurious pulses, and in which said second circuitry includes a low pass resistance/capacitance filter means to prevent corresponding spurious signals from being introduced into said enabling signal.

* * * * *